US012767737B2

(12) United States Patent
Gupta et al.

(10) Patent No.: US 12,767,737 B2
(45) Date of Patent: Oct. 20, 2026

(54) PROCESS FOR PREPARATION OF DISENTANGLED ULTRA-HIGH MOLECULAR WEIGHT ISOTACTIC POLYPROPYLENE

(71) Applicant: Reliance Industries Limited, Mumbai (IN)

(72) Inventors: Virendrakumar Gupta, Navi Mumbai (IN); Sanjay Rastogi, Eindhoven (NL); Dario Romano, Maastricht (NL); Ramiro Marroquin-Garcia, Maastricht (NL)

(73) Assignee: Reliance Industries Limited, Mumbai (IN)

( * ) Notice: Subject to any disclaimer, the term of this patent is extended or adjusted under 35 U.S.C. 154(b) by 777 days.

(21) Appl. No.: 18/043,848

(22) PCT Filed: Aug. 27, 2021

(86) PCT No.: PCT/IB2021/057855
§ 371 (c)(1),
(2) Date: Mar. 2, 2023

(87) PCT Pub. No.: WO2022/049467
PCT Pub. Date: Mar. 10, 2022

(65) Prior Publication Data

US 2024/0270882 A1 Aug. 15, 2024

(30) Foreign Application Priority Data

Sep. 2, 2020 (IN) ............................ 202021037842

(51) Int. Cl.
*C08F 110/06* (2006.01)

(52) U.S. Cl.
CPC ................................ *C08F 110/06* (2013.01)

(58) Field of Classification Search
None
See application file for complete search history.

(56) References Cited

U.S. PATENT DOCUMENTS

2009/0105407 A1 4/2009 Karjala et al.

FOREIGN PATENT DOCUMENTS

| | | | |
|---|---|---|---|
| EP | 0992517 | A2 | 4/2000 |
| WO | 2013076733 | A2 | 5/2013 |

OTHER PUBLICATIONS

International Search Report issued in International Application No. PCT/IB2021/057855 dated Nov. 16, 2011 (3 pages).
Written Opinion issued in International Application No. PCT/IB2021/057855 dated Nov. 16, 2011 (6 pages).
Liu, K. et al. Heterogeneous Distribution of Entanglements in a Nonequilibrium Polymer Melt of UHMWPE: Influence on Crystallization without and with Graphene OxideMacromolecules 2016, 49 (19), pp. 7497-7509 (13 pages).

*Primary Examiner* — Catherine S Branch
(74) *Attorney, Agent, or Firm* — Osha Bergman Watanabe & Burton LLP

(57) ABSTRACT

The present disclosure relates to a process for preparation of disentangled ultra-high molecular weight isotactic polypropylene. The disentangled ultra-high molecular weight isotactic polypropylene of the present disclosure has a low entanglement density, a low bulk density and a sphere like morphology. Further, the disentangled ultra-high molecular weight isotactic polypropylene of the present disclosure does not need costly and energy consuming post-production treatment for reducing the entanglement density.

17 Claims, 5 Drawing Sheets

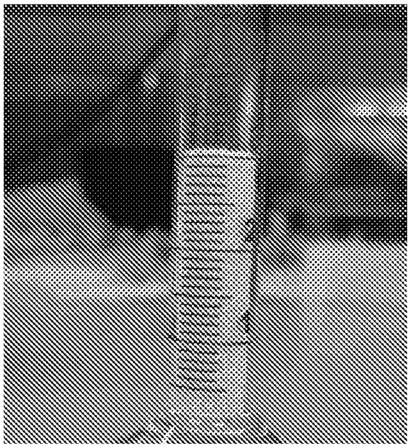
Figure 1-a
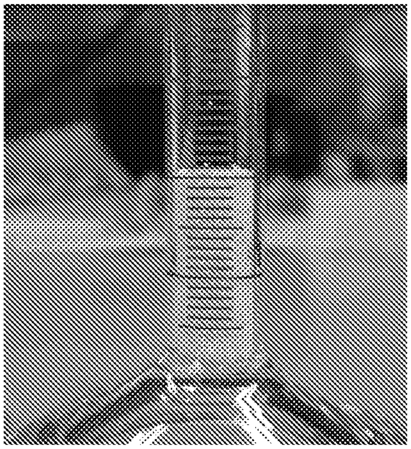
Figure 1-b
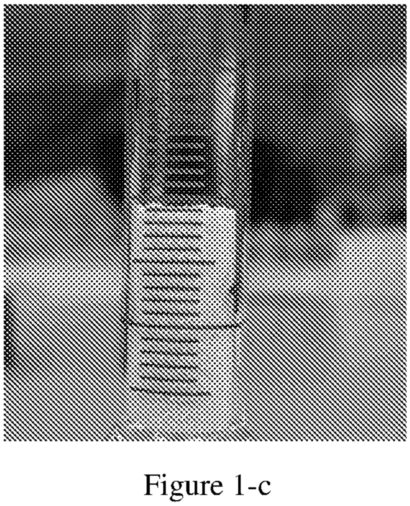
Figure 1-c
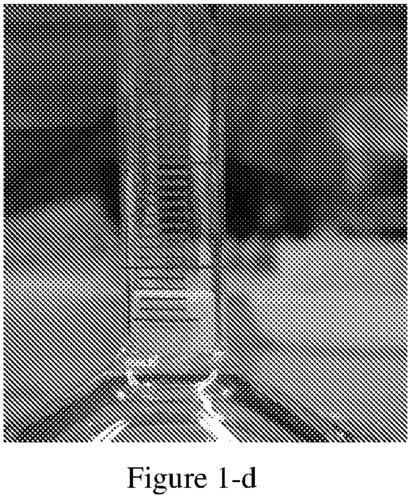
Figure 1-d

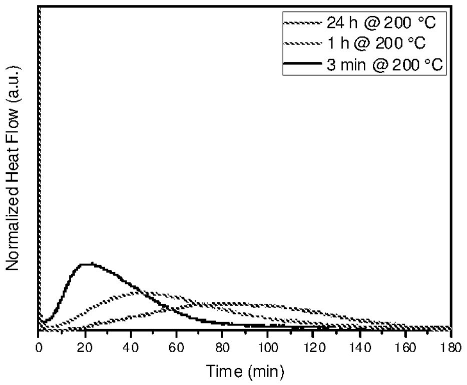
Figure 4-a
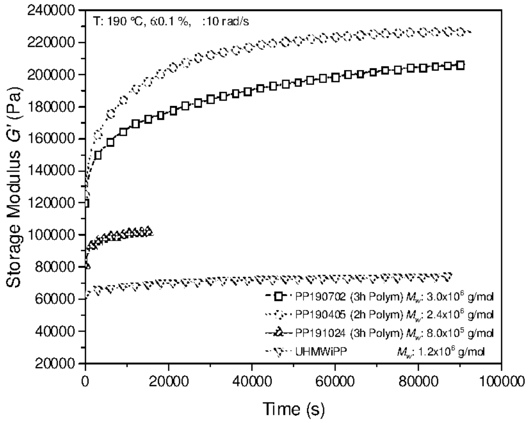
Figure 4-b
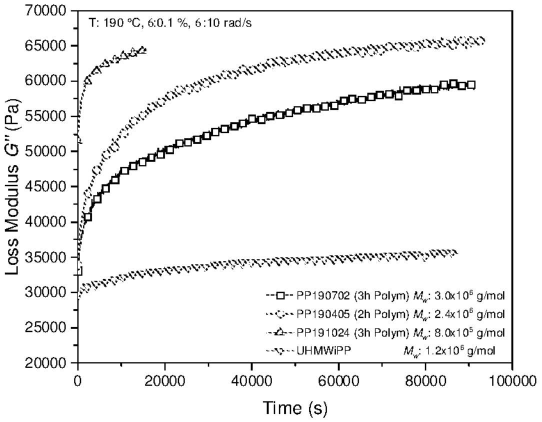
Figure 4-c

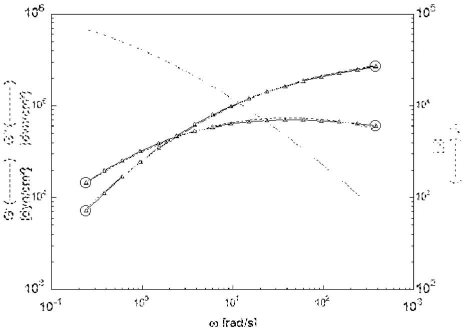
Figure 5-a
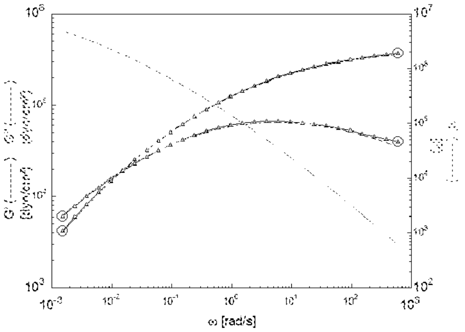
Figure 5-b
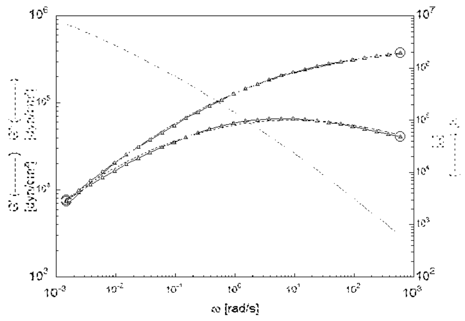
Figure 5-c
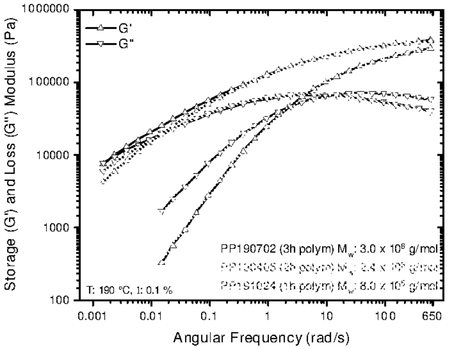
Figure 5-d

PROCESS FOR PREPARATION OF DISENTANGLED ULTRA-HIGH MOLECULAR WEIGHT ISOTACTIC POLYPROPYLENE

FIELD

The present disclosure relates to a process for preparation of disentangled ultra-high molecular weight isotactic polypropylene.

Definitions

As used in the present disclosure, the following terms are generally intended to have the meaning as set forth below, except to the extent that the context in which they are used to indicates otherwise.

Isotactic polypropylene: is a polypropylene in which all the methyl groups are stereochemically oriented along the same side of the polymer backbone chain.

Storage and loss modulus: The storage modulus in viscoelastic materials such as polymers, relates to the elastic portion and measures the material's ability to store energy elastically.

Storage modulus can be defined as the ratio of the elastic component of the stress to the strain. The loss modulus relates to the viscous part of the materials and measures the ability of the material to dissipate stress through heat. Loss modulus can be defined as the ratio of viscous component of the stress to the strain.

Oscillatory rheometry: is used to study both the viscous-like and the elastic-like properties of a material at different time scales. It is a valuable tool for understanding the structural and dynamic properties of the viscous-like and the elastic-like materials. The basic principle of an oscillatory rheometer is to induce a sinusoidal shear deformation in the sample and measure the resultant stress response; the time scale probed is determined by the frequency of oscillation (ω), of the shear deformation.

Disentangled polymer: is a polymer whose polymers chains resist a tendency to form entanglements with each other.

BACKGROUND

The background information herein below relates to the present disclosure but is not necessarily prior art.

Ultra-high molecular weight polymers are used in engineering applications such as ballistics, medical prostheses and high strength tapes. The ultra-high molecular weight isotactic polypropylene (UHMWiPP) possesses a low density, good thermal resistance, high stiffness, inherent biocompatibility and excellent fatigue resistance. It can potentially be used in fatigue demanding applications in biomedical, aerospace, and automotive fields.

For UHMWiPP, the properties are strongly linked to the molecular weight (M). Processing of the UHMWiPP is generally conducted in the melt state, wherein the polymer chains interact with each other forming entanglements. These entanglements are defined as physical constrains or friction points, which hinder the flowability of the polymer. Consequently, at higher molecular weight, which is the case for UHMWiPP, the chances of forming entanglements also increases. The relationship of melt viscosity (no) and molecular weight is defined using the following equation:

$$\eta_0 \propto M^{3.4}$$

Due to the relationship between molecular weight and melt viscosity of UHMWiPP, the processing of the UHMWiPP via conventional routes becomes impossible. As a result, alternative processing methods have been studied in order to reduce the entanglement density in UHMWiPP while preserving the high mechanical properties. The conventional methods to reduce the entanglement density used so far are expensive and energy consuming.

There is, therefore, felt a need to provide a process for preparation of disentangled ultra-high molecular weight isotactic polypropylene that mitigates the drawbacks mentioned hereinabove.

OBJECTS

Some of the objects of the present disclosure, which at least one embodiment herein satisfies, are as follows.

An object of the present disclosure is to ameliorate one or more problems of the prior art or to at least provide a useful alternative.

Another object of the present disclosure is to provide a process for preparing disentangled ultra-high molecular weight isotactic polypropylene having low entanglement density, low bulk density and sphere-like morphology.

Yet another object of the present disclosure is to provide a disentangled ultra-high molecular weight isotactic polypropylene having low entanglement density, low bulk density and sphere-like morphology.

Other objects and advantages of the present disclosure will be more apparent from the following description, which is not intended to limit the scope of the present disclosure.

SUMMARY

The present disclosure relates to a process for preparation of disentangled ultra-high molecular weight isotactic polypropylene. In the process, to a reactor containing at least one hydrocarbon solvent maintained under inert atmosphere, at least one scavenger is added and mixed to form a mixture. The mixture is stirred at first predetermined conditions to obtain a first solution. Then propylene gas at a pressure in the range of 1 bar to 3 bar is introduced into the reactor and second predetermined conditions are maintained to obtain a second solution. A pre-determined quantity of a pre-activated catalyst specie is added in the second solution. The pre-activated catalyst specie is obtained by reacting a catalyst with an activator, wherein the catalyst has a structural formula represented by formula 1.

Formula 1

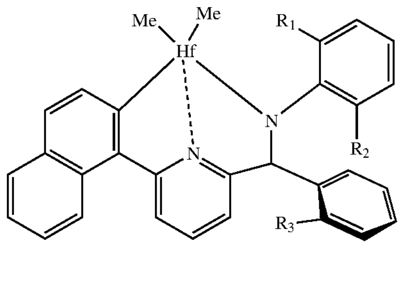

wherein $R_1$, $R_2$, $R_3$: is isopropyl.

The reactor is maintained under third predetermined conditions to obtain a third solution containing crude disentangled ultra-high molecular weight isotactic polypropylene (UHMWiPP). The third solution is quenched inside the reactor to obtain a quenched third solution containing a precipitate of crude UHMWiPP. The quenched third solution containing the precipitate of crude UHMWiPP is taken out from the reactor and filtered to obtain a residue of wet crude UHMWiPP. The residue of wet crude UHMWiPP is washed with ethanol and dried to obtain the disentangled UHMWiPP.

The present disclosure further relates to a pre-activated catalyst specie for use in the preparation of UHMWiPP. The pre-activated catalyst specie comprises a catalyst compound of formula 1 and an activator in a ratio in the range of 1:1 to 1:10. The catalyst has a structural formula represented by formula 1.

The present disclosure still further relates to a disentangled ultra-high molecular weight isotactic polypropylene characterized by having a molecular weight in the range of 500,000 to 4,000,000 g/mol, a bulk density in the range of 0.07 $g/cm^3$ and 0.7 $g/cm^3$, a spherical shape having a diameter in the range of 300 μm to 600 μm, a melting temperature in the range of 155° C. to 160° C., gradual increase of at least 20% in its storage (G) and loss (G') as a function of time during oscillatory shear time sweep experiment in the viscoelastic regime at 190° C., 10 rad/s and axial force in a range of 0.1N to 1N, a processing temperature below the melting point of the disentangled ultra-high molecular weight isotactic polypropylene, and a compression molding and rolling temperature in the range of 125° C. to 150° C.

BRIEF DESCRIPTION OF THE ACCOMPANYING DRAWING

The present disclosure will now be described with the help of the accompanying drawing, in which:

FIG. 1-*a* illustrates measurement of bulk density of UHMWiPP prepared in accordance with example 1 of the present disclosure;

FIG. 1-*b* illustrates measurement of bulk density of UHMWiPP prepared in accordance with example 2 of the present disclosure;

FIG. 1-*c* illustrates measurement of bulk density of UHMWiPP prepared in accordance with example 3 of the present disclosure;

FIG. 1-*d* illustrates measurement of bulk density of UHMWiPP prepared by the use of the Ziegler Natta catalyst system (comparative example);

Figure 6:
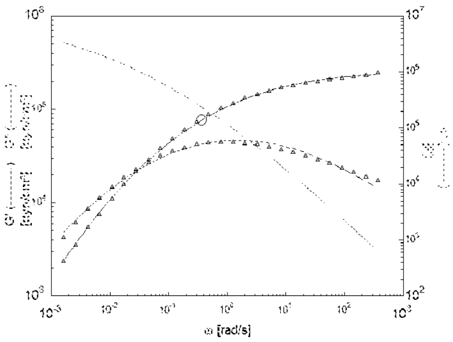

FIG. 4-*a* illustrates differential scanning calorimetry measurements of the UHMWiPP prepared in accordance with example 2 of the present disclosure for studying the effect of entanglement density on isothermal crystallization;

FIG. 4-*b* illustrates dynamic oscillatory rheology (time sweep) i.e., storage modulus vs time measurements for the UHMWiPP prepared in accordance with example 1, 2 and 3 of the present disclosure to study the effect of residing time in the melt on the formation of entanglements;

FIG. 4-*c* illustrates dynamic oscillatory rheology (time sweep) i.e., loss modulus vs time measurements of the UHMWiPP prepared in accordance with example 1, 2 and 3 of the present disclosure to study the effect of residing time in the melt on the formation of entanglements;

FIG. 5-*a* illustrates dynamic oscillatory rheology (frequency sweep) measurements to obtain an estimated molecular weight of the UHMWiPP prepared in accordance with example 1 of the present disclosure;

FIG. 5-*b* illustrates dynamic oscillatory rheology (frequency sweep) measurements to obtain an estimated molecular weight of the UHMWiPP prepared in accordance with example 2 of the present disclosure;

FIG. 5-*c* illustrates dynamic oscillatory rheology (frequency sweep) measurements to obtain an estimated molecular weight of the UHMWiPP prepared in accordance with example 3 of the present disclosure;

FIG. 5-*d* illustrates dynamic oscillatory rheology (frequency sweep) overlay measurements to obtain an estimated molecular weight of the UHMWiPP prepared in accordance with examples 1, 2 and 3 of the present disclosure; and FIG. 6 illustrates dynamic oscillatory rheology (frequency sweep) measurements to obtain an estimated molecular weight of the UHMWiPP prepared in accordance with example 4 of the present disclosure.

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The properties of UHMWiPP are dependent on the molecular weight. During the processing, when a melt state of the UHMWiPP is achieved, polymer chains of UHMWiPP tend to form entanglements with each other which hinder the flowability of the polymer. For the ultra-high molecular weight polyolefin like isotactic polypropylene, as the molecular weight increases, probability of forming entanglements also increases, thus the melt viscosity rises exponentially as the molecular weight of the UHMWiPP increases.

Due to the relationship between molecular weight and melt viscosity of UHMWiPP, the processing of UHMWiPP via conventional routes becomes impossible. Hence, to reduce the entanglement density in UHMWiPP while preserving the high mechanical properties alternative processing methods are required.

Recently, gelation, crystallization and gel-like spherulite press (GSP) methods are commercially used to produce ultra-high molecular weight polyethylene (UHMWPE) fibers with low entanglement density. However, these methods are mainly post-production treatments, and are expensive and energy consuming.

The present disclosure provides a process for preparation of disentangled UHMWiPP which is characterized by having a low entanglement density, a low bulk density and a sphere-like morphology. The disentangled UHMWiPP of the present disclosure do not require any costly and time-consuming post-production treatments for reducing the entanglement density.

In a first aspect of the present disclosure, there is provided a process for preparation of dis-entangled ultra-high molecular weight isotactic polypropylene.

The process is described in detail herein below:

First, a reactor containing at least one hydrocarbon solvent is maintained under inert atmosphere and at least one scavenger is added and mixed to form a mixture, and the mixture is stirred at first predetermined conditions to obtain a first solution.

In accordance with the embodiments of the present disclosure, the hydrocarbon solvent is at least one selected from toluene and heptane. In an embodiment, the hydrocarbon solvent is heptane.

In accordance with the embodiments of the present disclosure, the scavenger is selected from methylalumoxane (MAO) and tri-isobutyl aluminium (TiBA). In an embodiment, the scavenger is tri-isobutyl aluminium (TiBA).

Typically, the scavengers perform the function of scavenging of the impurities. Examples of these are oligomeric or polymeric alumoxanes, such as methylalumoxane (MAO) and metal alkylated species, such as triisobutyl aluminium (TiBA)

The process of the preparation of disentangled ultra-high molecular weight isotactic polypropylene is carried in an inert atmosphere. In an exemplary embodiment, the inert atmosphere is maintained by the use of nitrogen gas.

In accordance with the embodiments of the present disclosure, first predetermined conditions include a temperature in the range of 10° C. to 70° C., a time period in the range of 10 mins to 30 mins under a stirring speed in the range of 150 rpm to 350 rpm to obtain a first solution. In an embodiment, the temperature is 40° C., the time period is 20 mins and the stirring speed is 250 rpm.

In the next step, propylene gas at a pressure in the range of 1 bar to 3 bar is introduced into the reactor and second predetermined conditions are maintained to obtain a second solution. In an exemplary embodiment, the pressure of propylene gas is 1.1 bar.

It has been found that, the propylene pressure conditions can enhance the morphology of the disentangled UHMWiPP.

In accordance with the embodiments of the present disclosure, second predetermined conditions include a temperature in the range of 10° C. to 70° C. and a stirring speed in the range of 650 rpm to 850 rpm. In an exemplary embodiment, the temperature is 40° C. and the stirring speed is 750 rpm.

Next, a pre-determined quantity of a pre-activated catalyst specie is added in the second solution. Then, the reactor is maintained under third predetermined conditions to obtain a third solution containing crude disentangled ultra-high molecular weight isotactic polypropylene (UHMWiPP).

The pre-activated catalyst specie is obtained by reacting a catalyst with an activator, wherein the catalyst has a structure of formula 1.

Formula 1

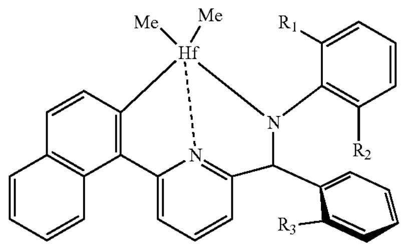

In an exemplary embodiment of the present disclosure, alkyl groups $R_1$, $R_2$ and $R_3$ are isopropyl. The use of R3=hydrogen atom (H) was evaluated for the polymerization of propylene, the thermal properties of the obtained polymer are lower when compared to R3=isopropyl.

In accordance with the embodiments of the present disclosure, the activator is at least one selected from N,N'-dimethylanilinium tetrakis (pentafluorophenyl) borate, trityl tetrakis (pentafluorophenyl) borate, tris(substituted aryl) boranes; and derivatives thereof. In an exemplary embodiment, the activator is N,N'-dimethylanilinium tetrakis (pentafluorophenyl) borate.

In accordance with the embodiments of the present disclosure, a ratio of the catalyst to the activator is in the range of 1:1 to 1:10. In an exemplary embodiment, the ratio is 1:1. In another exemplary embodiment, the ratio is 1:2.

In accordance with the embodiments of the present disclosure, third predetermined conditions include a temperature in the range of 10° C. to 70° C., a time period in the range of 1 hour to 3 hours under a stirring speed in the range of 650 rpm to 850 rpm. In an exemplary embodiment, the temperature is 40° C., the time period is 1 hour, and the stirring speed is 750 rpm. In another exemplary embodiment, the time period is 2 hours. In yet another embodiment, the time period is 3 hours.

For the production of propylene of ultra-high molecular weight, reduced entanglement density and fine sphere-like morphology, the catalyst based on hafnium complex require an activation step. Usually, the combination with a suitable activator leads to the formation of a pre-active catalyst, which in the presence of propylene monomer completes the activation step. Generally, a broad spectrum of activators such as alumoxanes, Lewis acids, Bronsted acids and the possible combinations are used. Preferably, the activator species must contain a cation (Bronsted acid) capable of breaking the H-Me bond via facile protonolysis and a non/weakly coordinating anion such as $M(C_6F_5)_4^-$ (M: B, Al).

In accordance with the embodiments of the present disclosure, a ratio of the catalyst to the scavenger is in the range of 1:50 to 1:100. In an exemplary embodiment, the ratio is 1:70.

The third solution is quenched inside the reactor to obtain a quenched third solution containing a precipitate of the crude disentangled UHMWiPP. In an exemplary embodiment, the quenching is carried out using ethanol.

The quenched third solution containing the precipitate of the crude disentangled UHMWiPP is taken out from the reactor and filtered the quenched third solution to obtain a residue of wet crude UHMWiPP. The residue of wet crude disentangled UHMWiPP is washed and dried to obtain disentangled UHMWiPP.

Further, the present disclosure relates to a pre-activated catalyst specie for use in the manufacture of UHMWiPP. The pre-activated catalyst specie comprises a catalyst having a structure of Formula 1 and an activator in a ratio in the range of 1:1 and 1:10. The catalyst has a structural of Formula 1.

Formula 1

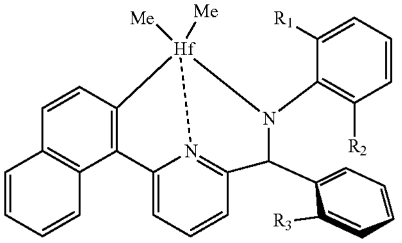

In an exemplary embodiment, the activator is N,N'-dimethylanilinium tetrakis (pentafluorophenyl) borate and the ratio of the catalyst to the activator is 1:1.

In an exemplary embodiment, the process for preparation of dis-entangled ultra-high molecular weight isotactic polypropylene includes following steps:

First, to a reactor containing at least one hydrocarbon solvent which is maintained under inert atmosphere, at least one scavenger is added and mixed to form a mixture, and stirring the mixture at a temperature of 40° C., stirring at the speed of 250 rpm for time period of 20 minutes to obtain a first solution. Then propylene gas at a pressure of 1.1 is introduced into the reactor and the temperature of 40° C., and stirring at the speed of 750 rpm is maintained to obtain a second solution. A pre-determined quantity of a pre-activated catalyst specie is added in the second solution. The pre-activated catalyst specie is obtained by reacting a catalyst with an activator, wherein a catalyst has a structural formula represented by formula 1.

Formula 1

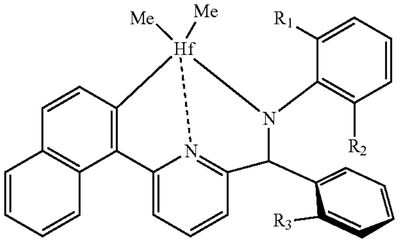

wherein $R_1$, $R_2$, $R_3$: is isopropyl.

Then, the reactor is maintained at 40° C., under stirring speed of 750 rpm for the time period in the range of 1 hour to 3 hours to obtain a third solution containing crude disentangled ultra-high molecular weight isotactic polypropylene (UHMWiPP). The third solution is quenched inside the reactor to obtain a quenched third solution containing a precipitate of the crude UHMWiPP. The quenched third solution containing the precipitate of the crude UHMWiPP is taken out from the reactor and filtered the quenched third solution to obtain a residue of wet crude UHMWiPP. The residue of wet crude UHMWiPP is washed with ethanol and dried to obtain the disentangled UHMWiPP.

In accordance with the embodiments of the present disclosure, the average molecular weight of the disentangled ultra-high molecular weight isotatctic polypropylene is in the range of 500,000 to 4,000,000 g/mol. In an exemplary embodiment, the average molecular weight is 800,000 g/mol. In another exemplary embodiment, the average molecular weight is 2,400,000 g/mol. In yet another exemplary embodiment, the average molecular weight is 3,000,000 g/mol.

In accordance with the embodiments of the present disclosure, the bulk density of the disentangled ultra-high molecular weight isotactic polypropylene is in the range of 0.05 $g/cm^3$ and 0.12 $g/cm^3$. In an exemplary embodiment, the bulk density is 0.065 $g/cm^3$. In another exemplary embodiment, the bulk density is 0.095 $g/cm^3$. In yet another exemplary embodiment, the bulk density is 0.105 $g/cm^3$.

In accordance with the embodiments of the present disclosure, the disentangled ultra-high molecular weight isotactic polypropylene is in the form of spherical particle having a diameter in the range of 300 μm to 600 μm. In an exemplary embodiment, the diameter is 500 μm. In another exemplary embodiment, the diameter is 600 μm.

In accordance with the embodiments of the present disclosure, the storage modulus (G') and loss modulus of the disentangled ultra-high molecular weight isotactic polypropylene displays a gradual increase greater than at least 20% as a function of time; during oscillatory shear time sweep experiments within the viscoelastic regime at 190° C., 10 rad/s and axial force in a range of 0.1N to 1N. In an exemplary embodiment, the storage modulus and loss modulus display a gradual increase of 20% as a function of time; during oscillatory shear time sweep experiments within the viscoelastic regime at 190° C., 10 rad/s and axial force of 0.1N. In another exemplary embodiment, the storage modulus and loss modulus display a gradual increase of 36% and 39%, respectively, as a function of time; during oscillatory shear time sweep experiments within the viscoelastic regime at 190° C., 10 rad/s and axial force of 1N. In yet another exemplary embodiment, the storage modulus and loss modulus display a gradual increase of 31% and 32%, respectively, as a function of time; during oscillatory shear time sweep experiments within the viscoelastic regime at 190° C., 10 rad/s and axial force of 1N.

In accordance with the embodiments of the present disclosure, the melting temperature of the disentangled ultra-high molecular weight isotactic polypropylene is in the range 155° C. to 160° C. In an exemplary embodiment, the melting temperature is 158° C. In another exemplary embodiment, the melting temperature is 159° C. In yet exemplary embodiment, the melting temperature is 160° C.

In accordance with the embodiments of the present disclosure, the processing temperature of the disentangled UHMWiPP is below the melting point of said ultra-high molecular weight polypropylene.

In accordance with the embodiments of the present disclosure, the compression molding and rolling temperature is in the range of 125° C. to 150° C. In an exemplary embodiment, the molding and rolling temperature is 135° C. In another exemplary embodiment, the molding and rolling temperature is 130° C.

The present disclosure further provides disentangled ultra-high molecular weight isotactic polypropylene characterized by having a molecular weight in the range of 500,000 to 4,000,000 g/mol, a bulk density in the range of 0.09 g/cm$^3$ and 0.12 g/cm$^3$, a spherical shape having diameter in the range of 300 μm to 600 μm, a melting temperature in the range of 155° C. to 160° C., a storage modulus and loss modulus showing a gradual increase of greater than at least 20% as a function of time; during oscillatory shear time sweep experiments within the viscoelastic regime at 190° C., 10 rad/s and axial force in the range of 0.1N to 1N, a processing temperature below the melting point of said ultra-high molecular weight polypropylene, a compression molding and rolling temperature in the range of 125° C. to 150° C. In embodiment, the molecular weight is 800,000 g/mol, the bulk density is 0.065 g/cm$^3$, the particle diameter is 600 microns, the melting temperature of 159° C., and, the storage modulus and loss modulus displays a gradual increase of 20% as a function of time; during oscillatory shear time sweep experiments within the viscoelastic regime at 190° C., 10 rad/s and axial force of 0.1N, a processing temperature below the melting point of said ultra-high molecular weight polypropylene, a compression molding and rolling temperature is 130° C. In another exemplary embodiment, the molecular weight is 2,400,000 g/mol, the bulk density is 0.095 g/cm$^3$, the particle diameter is 500 microns, the melting temperature is 158° C., and the storage modulus and loss modulus displays a gradual increase of 36% and 39%, respectively as a function of time; during oscillatory shear time sweep experiments within the viscoelastic regime at 190° C., 10 rad/s and axial force of 1N, a processing temperature below the melting point of said ultra-high molecular weight polypropylene, a compression molding and rolling temperature is 130° C. In yet another exemplary embodiment, the molecular weight is 3,000,000 g/mol, the bulk density is 0.105 g/cm$^3$, the diameter is 500 microns, the melting temperature is 158° C., and the storage modulus and loss modulus displays a gradual increase of 31 and 32%, respectively, as a function of time; during oscillatory shear time sweep experiments within the viscoelastic regime at 190° C., 10 rad/s and axial force of 1N, a processing temperature below the melting point of said ultra-high molecular weight polypropylene, a compression molding and rolling temperature is 130° C.

The present disclosure provides a process for preparation of disentangled UHMWiPP which is characterized by having a low entanglement density, a low bulk density and a sphere-like morphology. The disentangled UHMWiPP of the present disclosure do not require any costly and time-consuming post-production treatments for reducing the entanglement density.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be tested to scale up to industrial/commercial scale and the results obtained can be extrapolated to industrial scale.

Experimental Details

Process for preparation and characterization of disentangled ultra-high molecular weight isotactic polypropylene, in accordance with the present disclosure.

The Disentangled Ultra-High Molecular Weight Isotactic Polypropylene of the Present Disclosure was Characterized by Using the Following Methods/Procedures:

Bulk density measurement: 0.2 g of disentangled UHMWiPP was weighed and then placed in a 5 mL graduated cylinder. Density was determined by calculating the ratio between the amount of polymer (g) and the occupied volume in the cylinder (ml).

Measurement for percentaqe of isotactic nature: The percentage of isotactic nature was represented by percent pentads (% mmmm) and determined by $^{13}C$ NMR spectroscopy. Proton decoupled $^{13}C\{^1H\}$ NMR measurements was conducted on a Bruker Avance Neo 400 NMR spectrometer, the chemical shifts was internally referenced to the methyl signal of the isotactic pentad (mmmm) at ~21.85 ppm. Typically, 50 to 60 mg of disentangled UHMWiPP sample was dissolved in $C_6D_5Br$ at high temperatures. The % mmmm was quantified by integration of the methyl region between 22.0 to 19.7 ppm and reported as mole fraction in percentage. It was found that all the polymers synthesized by the presented route exhibit an isotacticity (>90%).

Measurement of crystallinity: The percentage of crystallinity was determined by using Differential scanning calorimetry (DSC). The percentage of crystallinity was determined using commercially available DSC equipment, such as TA Instruments Q250 with TRIOS software. The percentage of crystallinity was obtained by calculating the ratio between the sample's normalized heat of fusion ($\Delta H_f$) and the theoretical value for 100% crystalline iPP (204 J/g), using the first melting endotherm (between 100 and 180° C.) and heating rate of 10° C./min.

Differential Scanning Calorimetry (DSC):

1. Characterization of entanglement density of disentangled UHMWiPP prepared in accordance to the present disclosure: Differential scanning calorimetry was performed using a commercially available equipment (such as TA Instruments Q250 DSC) to determine the effect of the residing time in the melt on the crystallization kinetics at isothermal conditions (related to the entanglement formation upon annealing the samples in the melt). The sample was prepared using Tzero® Aluminum pans and lids. 1.5 mg of polymer sample was placed inside the pans and sealed using commercially available micro press (TA Instruments). Once the pan was sealed, specific thermal protocol was applied to the sample in accordance with (Liu, K.; De Boer, E. L.; Yao, Y.; Romano, D.; Ronca, S.; Rastogi, S., *Macromolecules* 2016, 49 (19), 7497-7509), which is presented herein as a reference. Sample was equilibrated at 50° C. under nitrogen atmosphere, then heated at constant 10° C./min up to 200° C. At 200° C., different isothermal times (3 min, 1 h and 24 h) were applied in order to evaluate the effect in the entanglement density. After this time, sample was cooled at a constant 10° C./min to 135° C. The residing time under isothermal conditions (135° C.) is set to 3 h. Finally, sample was cooled to 50° C. at a constant rate of 10° C./min.
2. Measurement of melting point of disentangled UHMWiPP: DSC was also used for determining the melting point of the disentangled UHMWiPP prepared in accordance with the present disclosure. The melting point was in the range of 150 to 160° C. depending on the polymerization conditions.

Oscillatory rheology measurement: The characterization of the entanglement density was conducted using oscillatory rheology measurements, dynamic frequency and time sweeps experiments were performed using a commercially available equipment (such as Anton-Paar MCR 702 Multi-Drive rheometer) to determine the effect of time, temperature, frequency and its combinations on the loss and storage modulus (attributed to the entanglement formation). Typically, 0.5 g of disentangled UHMWiPP was placed in a stainless steel circular mold with a diameter of 25 mm and later compressed at 125° C. using a maximum load of 30 bar for 30 min. The sample was cooled at 10° C./min under constant 30 bar pressure. After this, the sample was placed in-between the rheometer plates at a temperature of 110° C., sample was then heated at a constant rate until 190 or 220° C. Then an oscillation amplitude sweep was performed at constant values of frequency (ω=10 rad/s) and axial forces ranging from 0.25 N to 4 N). Finally, oscillation frequency sweep was conducted at constant values of strain (selected from the previous step), frequency (ω=10 rad/s) and axial force (0.25 N). Further, according to the present disclosure, the effect of residing time in the melt on the formation of entanglements was evaluated using dynamic oscillatory rheology (time sweep experiment). As described above, the disentangled UHMWiPP was hot compressed below its melting point in order to create a rheological specimen. This specimen was then heated from 110 to 190° C. (10° C./min). The sample was let to equilibrate for 3 minutes and then an oscillation time experiment was conducted in the linear viscoelastic regime (10 rad/s and 0.1% strain).

Storage and loss modulus were calculated from the dynamic oscillatory rheology (time sweep experiment) described above. The storage modulus of disentangled UHMWiPP is related to the molecular weight between entanglements ($M_e$) in the equilibrium rubbery plateau according to: $G_n^0 = g_N \rho RT/\langle M_e \rangle$, where $g_N$ is a numerical factor (1 or 4/5 depending on the convection), ρ is the density, R is the gas constant and T is the absolute temperature. Considering that a low entanglement density is translated to a high value of $M_e$, the resulting elastic response (non-equilibrium) is $G' < G_n^0$, as the other terms in the previous formula are usually constant. Therefore, a gradual increase in the storage modulus G' as a function of time in the melt suggested a gradual increase in the entanglement density (low $M_e$).

Based on the results of oscillatory shear time sweep experiment of the present disclosure, the UHMWiPP was categorized as disentangled when the storage (G') and loss (G') modulus displays a gradual increase of at least 20% as a function of time during oscillatory shear time sweep experiment in the viscoelastic regime at 190° C., 10 rad/s and axial force in a range of 0.1N to 1N.

Molecular weight measurement: The mass average molecular weight ($M_w$) and the polydispersity ($M_w/M_n$) values of disentangled UHMWiPP samples were evaluated by means of dynamic oscillatory rheology experiments and gel permeation chromatography. $M_w$ disentangled UHMWiPP of the present disclosure was found to be in the range of 800,000 to 4,000,000. The polydispersity of the disentangled UHMWiPP of the present disclosure were in the range of 2.0 to 15.0.

Preparation for the Reagents for the Preparation of the Disentangled Ultra-High Molecular Weight Isotactic Polypropylene of the Present Disclosure was Characterized Using Following Procedures:

The preparation of the activator and scavenger reagent solutions were performed under a purified nitrogen atmosphere in a glove box and using standard Schlenk techniques. All solvents used were anhydrous, de-oxygenated and purified using a solvent purification system (SPS).

Preparation of the activator reagent solution: Inside a glovebox, N,N'-dimethylanilinium tetrakis (pentafluorophenyl) borate (10 μmol, 8.16 mg) was weighted using an anti-static funnel. The compound was transferred to a 25 mL glass Schlenk vial and then dissolved using a magnetic bar using 5 mL of dry toluene from the SPS. The compound was constantly stirred for 1 hour at 20° C.

Preparation of the scavenger reagent solution: Inside a glovebox, 0.55 mL of tri-isobutyl aluminum (TiBA) solution (25 wt. % in toluene) was placed in a 25 mL Schlenk vial. The TiBA solution (700 μmol, 0.55 mL) was transferred to the vial using a 1 mL plastic syringe and needle, from the original solution container.

Preparation of the Dis-Entangled Ultra-High Molecular Weight Polypropylene

Example 1

Propylene polymerization was carried out in a Buchi glasuster batch reactor of 1.5 L, containing a three-blade propeller, a thermocouple and oil temperature control. 7 cycles of dry nitrogen (P: 2.5 bar) and vacuum (−1.0 bar) were applied in order to flush the reactor. The flushed reactor was then filled with nitrogen and heated continuously to 125° C. After temperature equilibration, high vacuum was continuously applied for at least 8 to 12 hours in order to remove the nitrogen and any remaining moisture. Then, the reactor temperature was set to the desired value to start the polymerization reaction at 40° C. Once the temperature was stable, the reactor was loaded with 750 mL of heptane. The reactor was continuously stirred at 250 rpm under dry nitrogen atmosphere. Once temperature was stable, 700 μmol, (0.55 mL) of the scavenger reagent i.e TiBA solution, as prepared above, was injected into the reactor under continuous nitrogen flow and let it stir at 250 rpm for 20 min to obtain a first solution. The ratio of catalyst: scavenger was 1:70. Then, the stirring was stopped, and high vacuum was applied until the reactor pressure reached a value −0.9 bar. Once the pressure was stable, the vacuum was stopped, and propylene monomer was introduced to the mixture into the reactor under continuous stirring (750 rpm) and at a constant absolute pressure of 1.1 bar to obtain a second solution.

Separately, inside a glovebox, 10 μmol (7.19 mg) of N-[2,6-Bis(1-methylethyl)phenyl]-α-[2-(1-methylethyl)-phenyl]-6-(1-naphthalenyl-κC2)-2-pyridinemathanaminato (2−)-κN1, κN2]dimethylhafnium catalyst (compound of formula 1) was weighted using an anti-static funnel. The catalyst was dissolved into a Schlenk flask using a magnetic bar and 4 mL of dry toluene from the solvent purification system (SPS). After 1 minute of continuous mixing, 5 mL of N,N'-dimethylanilinium tetrakis (pentafluorophenyl) borate solution (10 μmol, 8.16 mg), as prepared above, was reacted with the catalyst solution to obtain a solution containing pre-activated catalyst specie. The ratio of catalyst to activator was kept 1:1. The solution containing pre-activated catalyst specie was continuously stirred for 5 minutes.

The polymerization reaction was started by adding 9 mL of solution containing pre-activated catalyst specie to the second solution for 10 mins under continuous propylene monomer flow and constant stirring (750 rpm). The reaction was carried out for 1 hour to obtain a third solution containing crude disentangled ultra-high molecular weight isotactic polypropylene (UHMWiPP).

The third solution was quenched by the injection of 5 mL of ethanol (70% v/v) into the third solution in the reactor, and by the release of residual propylene monomer inside the reactor to obtain a quenched third solution containing a precipitate of the crude disentangled UHMWiPP. After polymerization was quenched, the temperature in the reactor was set to 23° C. Once the temperature was stable, the reactor was opened, and the quenched third solution containing a precipitate of the crude disentangled UHMWiPP was collected. The quenched third solution containing a precipitate of the crude disentangled UHMWiPP was then washed two times with an excess of ethanol and filtered under reduced pressure to obtain wet crude UHMWiPP. The wet crude UHMWiPP was then dried at room temperature for at least 7 days. The wet crude UHMWiPP can also be dried at 40° C. and reduced pressure for 12 hours to obtain UHMWiPP.

Example 2

Example 2 was performed in a similar manner as experiment 1, except that the polymerization reaction was carried out for 2 hours.

Example 3

Example 3 was performed in a similar manner as experiment 1, except that the polymerization reaction was carried out for 3 hours.

Properties of the disentangled UHMWiPP as obtained from examples 1, 2 and 3 are presented in table 1 below.

TABLE 1

Properties of UHMWiPP prepared according to examples 1, 2 and 3

| | Example | | |
|---|---|---|---|
| Conditions: | 1 | 2 | 3 |
| Catalyst (mg) | 7.31 | 7.26 | 7.20 |
| Polymerization time (h) | 1 | 2 | 3 |
| Activator (mg) | 8.5 | 8.24 | 8.52 |
| Scavenger Conc. (mL) | 0.55 | 0.55 | 0.55 |
| Yield (g) | 22 | 50 | 42 |
| Activity (Kg Polym/mol Hf · h · bar) | 1833 | 2083 | 1165 |
| $M_w$ Rheology (g/mol) | 800,000 | 2,400,000 | 3,000,000 |
| Polydispersity | 2.0 | 4.5 | 7.2 |
| % mmmm (% isotacticity) | >90% | >90% | >90% |
| Polymer morphology | Sphere | Sphere | Sphere |
| Bulk density (g/mL) | 0.065 | 0.095 | 0.105 |
| Avg. particle size (μm) | 600 | 500 | 500 |
| % increase in storage modulus in as a function of time during oscillatory shear time sweep experiment in the viscoelastic regime at 190° C., 10 rad/s and axial force in a range of 0.1N to 1N | 20% (axial force: 0.1N) | 36% (axial force: 1N) | 31% (axial force: 1N) |
| % increase in loss modulus in as a function of time during oscillatory shear time sweep experiment in the viscoelastic regime at 190° C., 10 rad/s and axial force in a range of 0.1N to 1N | 20% (axial force: 0.1N) | 39% (axial force: 1N) | 32% (axial force: 1N) |
| Molding and rolling temperature | 130° C. | 130° C. | 130° C. |

Figure 2:
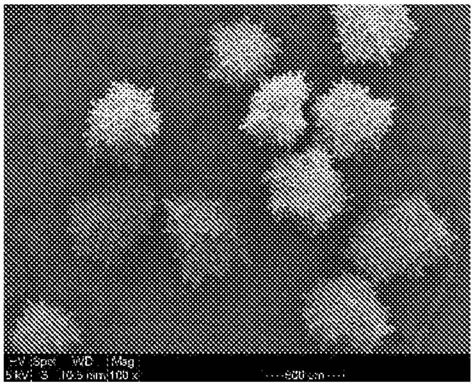
FIG. 2 illustrates a scanning electron microscopy image (scale bar: 500 microns) of the UHMWiPP prepared in accordance with example 2 of the present disclosure.
Figure 3:
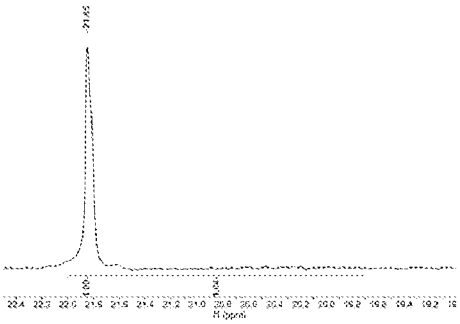
FIG. 3 illustrates a proton decoupled $^{13}C$ NMR measurement of the UHMWiPP prepared in accordance with example 2 of the present disclosure.

Bulk density measurement of disentangled UHMWiPP prepared in accordance with examples 1, 2 and 3 are as shown in FIGS. 1-*a*, 1-*b* and 1-*c*. As shown in FIG. 1-*d*, the bulk density of the UHMWiPP prepared using Ziegler Natta catalyst system was 0.669 g/cm$^3$ which was higher than the bulk density of the disentangled UHMWiPP prepared in accordance to the present disclosure. Size of the disentangled UHMWiPP measured using scanning electron microscopy as shown in FIG. 2. The size of the disentangled UHMWiPP prepared in accordance with example 2 was reported to be 500 microns. Percentage of isotacticity of the disentangled UHMWiPP as prepared in accordance to the present disclosure was calculated using proton decoupled carbon NMR as shown in FIG. 3 (Example 2). For disentangled UHMWiPP as prepared as per the above examples, the percentage of isotacticity was found to be >90%. The molecular weight of the disentangled UHMWiPP as obtained from examples 1, 2 and 3 were measured using dynamic oscillatory rheology measurements as shown in FIG. 5-*a*, 5-*b*, 5*c* respectively. FIG. 5-*d* illustrated the overlay of the oscillatory rheology measurements disentangled UHMWiPP as obtained from examples 1, 2 and 3. Various frequency sweep measurements were recorded and then analysed in order to obtain an estimated molecular weight and polydispersity.

Differential scanning calorimetry was performed disentangled UHMWiPP as obtained from example 2 to evaluate the entanglement density as shown in FIG. 4-*a*. The effect of the residing time in the melt on the crystallization time under isothermal conditions is summarized in the table 2 below:

TABLE 2

Effect of the residing time in the melt (200° C.) on the isothermal crystallization at 135° C. of disentangled UHMWiPP (Example 2)

| Time @ 200 | Crystallization at max enthalpy | Onset crystallization time |
|---|---|---|
| 3 min | 23.0 min | 6.4 min |
| 1 h | 45.0 min | 12.0 min |
| 24 h | 78.0 min | 14.5 min |

As shown in the FIG. 4-*a*, the residing time at the melt (200° C.) was 3 min, 1 h and 24 h. A relatively low time in the melt of 3 minutes (black curve) lead to a rapid nucleation and crystal growth represented by the curve onset (~1 min) and maximum height (~20 min) respectively. On the contrary, increasing time in the melt (e.g. 1 and 24 h), led to clear shift to longer onset times (5 and 10 min) and a broadening in the overall curves shape (red and blue curve respectively). These results indicated the presence of a low entanglement density in the disentangled UHMWiPP prepared in accordance with example 2 of the present disclosure. As the sample was kept in the melt for longer times the re-entangling of the chains gradually occurred. The entanglements acted as a mobility-restrictors which hindered the nucleation and consequently prolonged the crystallization process of the material. As presented in table 2, the increasing time in the melt resulted in a delay in the nucleation (onset) and in the crystal growth determined by the maximum enthalpy value as a function of time.

As shown in FIG. 4-*b* and FIG. 4-*c*, the entanglement density of disentangled UHMWiPP prepared in accordance with examples 1, 2 and 3 were evaluated by using dynamic oscillatory rheology and measuring storage modulus and loss modulus respectively as a function of time. FIG. 4-*b* showed that, the storage modulus of the disentangled UHMWiPP prepared in accordance with examples 1, 2 and 3 of the present disclosure increased at least 20% by the end of the experiment. Similarly, FIG. 4-*c* showed that, the loss modulus of the disentangled UHMWiPP prepared in accordance with examples 1, 2 and 3 of the present disclosure increased at least 20% by the end of the experiment. These results were attributed to a heterogeneous (non-equilibrium) distribution of entanglements in the molten state. Therefore, FIG. 4-*b* and FIG. 4-*c* illustrate that the UHMWiPP prepared according with examples 1, 2 and 3 had low entanglement density at the beginning of the experiment and the gradual increase in the storage and loss modulus as a function of time in the melt suggest a gradual increase in the entanglement density. Lowermost curve in FIGS. 4*b* and 4*c* (green curve-points marked as the inverted triangles) also demonstrated that the UHMWiPP prepared by the use of the Ziegler Natta catalyst system (comparative example) only showed the increase of storage and loss modulus of only 10% as a function of time, indicating that the UHMWiPP prepared by the use of the Ziegler Natta catalyst system was not disentangled when compared to the UHMWiPP prepared according to examples 1, 2 and 3 of the present disclosure.

Example 4

Example 4 was performed in a similar manner as experiment 2 except 20 μmol of N,N'-dimethylanilinium tetrakis (pentafluorophenyl) borate was used. The ratio of catalyst to activator was kept 1:2. Results of the polymerization are listed in table 3 below:

TABLE 3

Comparison of the properties of the disentangled UHMWiPP prepared in accordance with Examples 1 and 4.

| | Example | |
|---|---|---|
| Conditions: | 1 | 4 |
| Catalyst (mg) | 7.26 | 7.26 |
| Metal:Activator | 1:1 | 1:2 |
| Polymerization time (h) | 2 | 2 |
| Activator (mg) | 8.24 | 16.28 |
| Scavenger Conc. (mL) | 0.55 | 0.55 |
| Yield (g) | 50 | 29 |
| Activity (Kg Polym/mol Hf · h · bar) | 2083 | 1183 |
| $M_w$ Rheology (g/mol) | 2,400,000 | 3,000,000 |
| Polydispersity | 2.0 | 2.6 |
| % mmmm | >90% | >90% |
| Polymer morphology | Sphere like | Gel-like |
| Bulk density (g/mL) | 0.095 | N/A |
| Avg. particle size (μm) | 500 | N/A |

Table 3 shows that, disentangled UHMWiPP synthesized using a catalyst to activator ratio of 1:2 yielded a gel like morphology, whereas the 1:1 sample presented a fine sphere-like morphology.

As shown in FIG. 5-*d*, the molecular weight and polydispersity of the disentangled UHMWiPP prepared in accordance with examples 1, 2, and 3 was calculated using oscillation oscillatory rheology measurements.

Further, thermal properties of disentangled UHMWiPP prepared in accordance with examples 1, 2, 3 and 4 were measured using DSC which are summarized in table 4 below:

TABLE 4

Comparison of disentangled UHMWiPP prepared in examples 1-4

| Example | Polym time (h) | Catalyst:Activator | $T_m$ (° C.) | $\Delta H_f$ (J/g) | Cryst (%)[a] | $T_c$ (° C.) | $\Delta H_c$ (J/g) |
|---|---|---|---|---|---|---|---|
| 1 | 1 | 1:1 | 159 | 116 | 57 | 125 | 105 |
| 2 | 2 | 1:1 | 158 | 117 | 57 | 118 | 107 |
| 3 | 3 | 1:1 | 158 | 119 | 58 | 119 | 112 |
| 4 | 2 | 1:2 | 160 | 119 | 58 | 125 | 98 |

[a] $\Delta H_0$ = 204 J/g

As can be seen from the table, the melting temperature of the disentangled UHMWiPP of the present disclosure is in the range of 158° C. to 160° C. and the crystallinity of the disentangled UHMWiPP prepared in accordance with examples 1, 2, 3 and 4 is in the range of 55 to 60%.

The present disclosure provides a method preparation of disentangled UHMWiPP with low entanglement density, low bulk density and sphere-like morphology and do not require any post processing treatment for reducing the entanglement density.

TECHNICAL ADVANCES AND ECONOMICAL SIGNIFICANCE

The process of the present disclosure described herein above has several technical advantages including, but not limited to, the realization of;

Process for preparation of the disentangled ultra-high molecular weight isotactic polypropylene characterized by having a low entanglement density, a low bulk density and a sphere-like morphology.

The disentangled ultra-high molecular weight isotactic polypropylene has low entanglement density which do not need post-production treatment for reducing entanglement density.

The embodiments as described herein above, and various features and advantageous details thereof are explained with reference to the non-limiting embodiments in the following description.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The foregoing description of specific embodiments so fully reveal the general nature of the embodiments herein, that others can, by applying current knowledge, readily modify and/or adapt for various applications of such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein. Further, it is to be distinctly understood that the foregoing descriptive matter is to be interpreted merely as illustrative of the disclosure and not as a limitation.

Having described and illustrated the principles of the present disclosure with reference to the described embodiments, it will be recognized that the described embodiments can be modified in arrangement and detail without departing from the scope of such principles.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparation of disentangled ultra-high molecular weight isotactic polypropylene, said process comprising the following steps:

a) in a reactor, maintained under inert atmosphere and containing at least one hydrocarbon solvent, adding at least one scavenger, mixing and stirring the mixture so formed at first predetermined conditions to obtain a first solution;

b) introducing propylene gas at a pressure in the range of 1 bar to 3 bar into said reactor and maintaining second predetermined conditions to obtain a second solution;

c) adding, in said second solution, a pre-determined quantity of a pre-activated catalyst specie, wherein said pre-activated catalyst specie is formed by reacting a catalyst having a structural formula 1 with an activator to obtain said pre-activated catalyst specie, Formula 1

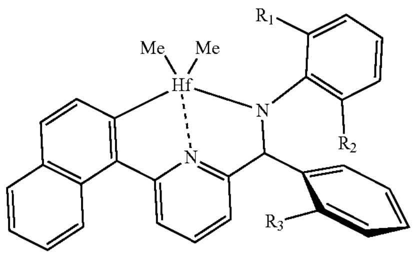

wherein $R_1$,$R_2$,$R_3$: is isopropyl;

d) maintaining said reactor under third predetermined conditions to obtain a third solution containing crude disentangled ultra-high molecular weight isotactic polypropylene (UHMWiPP);

e) quenching said third solution inside said reactor to obtain a quenched third solution containing a precipitate of said crude disentangled UHMWiPP;

f) taking out said quenched third solution containing said precipitate from said reactor and filtering said quenched third solution to obtain a residue of wet crude disentangled UHMWiPP; and g) washing and drying said residue of wet crude disentangled UHMWiPP to obtain said disentangled UHMWiPP.

2. The process as claimed in claim 1, wherein said activator is at least one selected from N,N'-dimethylanilinium tetrakis (pentafluorophenyl) borate, trityl tetrakis (pentafluorophenyl) borate, tris (substituted aryl) boranes, and derivatives thereof.

3. The process as claimed in claim 1, wherein the ratio of said catalyst to said activator is in the range of 1:1 to 1:10.

4. The process as claimed in claim 1, wherein the ratio of said catalyst to said activator is 1:1.

5. The process as claimed in claim 1, wherein said first predetermined conditions are selected from temperature in the range of 10° C. to 70° C., stirring speed in the range of 150 rpm to 350 rpm and time period in the range of 10 minutes to 30 minutes.

6. The process as claimed in claim 5, wherein said first predetermined conditions include temperature of 40° C., stirring speed of 250 rpm and time period of 20 minutes.

7. The process as claimed in claim 1, wherein said second predetermined conditions are selected from temperature in the range of 10° C. to 70° C., and stirring speed in the range of 650 rpm to 850 rpm.

8. The process as claimed in claim 7, wherein said second predetermined conditions include temperature of 40° C. and stirring speed of 750 rpm.

9. The process as claimed in claim 1, wherein said third predetermined conditions are selected from temperature in the range of 10° C. to 70° C., stirring speed in the range of 650 rpm to 850 rpm and time period in the range of 1 hour to 3 hours.

10. The process as claimed in claim 9, wherein said third predetermined conditions include temperature of 40° C., stirring speed of 750 rpm and time period of 1 hour.

11. The process as claimed in claim 9, wherein said third predetermined conditions include temperature of 40° C., stirring speed of 750 rpm and time period of 2 hours.

12. The process as claimed in claim 9, wherein said third predetermined conditions include temperature of 40° C., stirring speed of 750 rpm and time period of 3 hours.

13. The process as claimed in claim 1, wherein said scavenger is at least one scavenger selected from the group consisting of methylalumoxane (MAO) and tri-isobutyl aluminium (TiBA).

14. The process as claimed in claim 1, wherein the ratio of said catalyst reacted to form the pre-activated catalyst specie to said scavenger is in the range of 1:100 to 1:50.

15. The process as claimed in claim 1, wherein the ratio of said catalyst reacted to form the pre-activated catalyst specie to said scavenger is 1:70.

16. The process as claimed in claim 1, wherein said hydrocarbon solvent is at least one selected from toluene and heptane.

17. The process as claimed in claim 1, wherein said process comprises the following steps:

a) in a reactor, maintained under inert atmosphere and containing at least one hydrocarbon solvent, adding at least one scavenger, mixing and stirring the mixture so formed at a temperature of 40° C., stirring at the speed of 250 rpm for time period of 20 minutes to obtain a first solution;

b) introducing propylene gas at a pressure of 1.1 bar into said reactor and maintaining the temperature of 40° C., and stirring at the speed of 750 rpm to obtain a second solution;

c) adding, in said second solution, a pre-determined quantity of a pre-activated catalyst specie, wherein said pre-activated catalyst specie is formed by reacting a catalyst having a structural formula 1 with an activator to obtain said pre-active catalyst specie, Formula 1

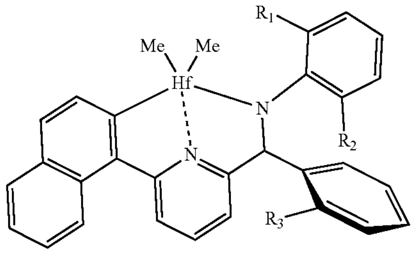

wherein $R_1$,$R_2$,$R_3$: is isopropyl;

d) maintaining said reactor at 40° C., under stirring speed of 750 rpm for a time period in the range of 1 hour to 3 hours to obtain a third solution containing crude disentangled ultra-high molecular weight isotactic polypropylene (UHMWiPP);

e) quenching said third solution inside said reactor to obtain a quenched third solution containing a precipitate of said crude disentangled UHMWiPP;

f) taking out said quenched third solution containing said precipitate from said reactor and filtering said quenched third solution to obtain a residue of wet crude disentangled UHMWiPP; and g) washing and drying said wet crude disentangled UHMWiPP to obtain said disentangled UHMWiPP.

* * * * *